(12) United States Patent
Hruska

(10) Patent No.: US 11,674,846 B2
(45) Date of Patent: Jun. 13, 2023

(54) CALIBRATION FOR AN INSTRUMENT (DEVICE, SENSOR)

(71) Applicant: VIAVI Solutions Inc., San Jose, CA (US)

(72) Inventor: Curtis R. Hruska, Cloverdale, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 17/447,951

(22) Filed: Sep. 17, 2021

(65) Prior Publication Data

US 2022/0003600 A1 Jan. 6, 2022

Related U.S. Application Data

(63) Continuation of application No. 16/879,856, filed on May 21, 2020, now Pat. No. 11,137,288, which is a
(Continued)

(51) Int. Cl.
*G01J 3/02* (2006.01)
*G01J 3/42* (2006.01)
(Continued)

(52) U.S. Cl.
CPC ............. *G01J 3/0297* (2013.01); *G01J 3/027* (2013.01); *G01J 3/42* (2013.01); *G01N 21/274* (2013.01);
(Continued)

(58) Field of Classification Search
CPC .... G01J 3/297; G01J 3/027; G01J 3/42; G01J 3/0205; G01J 3/10; G01N 21/274;
(Continued)

(56) References Cited

U.S. PATENT DOCUMENTS

| 5,835,230 A | 11/1998 | McAndrew et al. |
| 6,067,156 A | 5/2000 | Slater et al. |

(Continued)

FOREIGN PATENT DOCUMENTS

| CN | 104215579 A | 12/2014 |
| CN | 104364635 A | 2/2015 |

(Continued)

OTHER PUBLICATIONS

Extended European Search Report for Application No. EP18167839, dated Jul. 3, 2018, 12 pages.
(Continued)

*Primary Examiner* — Tarifur R Chowdhury
*Assistant Examiner* — Omar H Nixon
(74) *Attorney, Agent, or Firm* — Harrity & Harrity, LLP

(57) ABSTRACT

A device may determine a calibration value for a spectrometer using light from a first light source; deactivate the first light source after determining the calibration value; perform measurement with regard to a sample based on the calibration value, wherein the measurement of the sample is performed using light from a second light source; determine that the calibration value is to be updated; and update the calibration value using the light from the first light source.

20 Claims, 8 Drawing Sheets

100 ⟶

Dark-state baseline calibration

External light source 110
(deactivated)

Lens

Related U.S. Application Data continuation of application No. 15/937,177, filed on Mar. 27, 2018, now Pat. No. 10,663,344.

(60) Provisional application No. 62/490,445, filed on Apr. 26, 2017.

(51) Int. Cl.
    *G01N 21/27* (2006.01)
    *G01J 3/10* (2006.01)

(52) U.S. Cl.
    CPC ............ *G01J 3/0205* (2013.01); *G01J 3/10* (2013.01); *G01N 2201/1273* (2013.01); *G01N 2201/12707* (2013.01); *G01N 2201/12715* (2013.01); *G01N 2201/12723* (2013.01); *G01N 2201/12738* (2013.01)

(58) Field of Classification Search
    CPC .......... G01N 2201/12707; G01N 2201/12715; G01N 2201/12723; G01N 2201/1273; G01N 2201/12738
    USPC ....................................................... 356/326
    See application file for complete search history.

(56) References Cited

U.S. PATENT DOCUMENTS

| | | |
|---|---|---|
| 6,075,581 A | 6/2000 | Shirochi |
| 8,953,165 B2 | 2/2015 | Feitisch et al. |
| 9,188,486 B1 | 11/2015 | Xu et al. |
| 9,535,053 B1 | 1/2017 | Cafferty et al. |
| 9,618,391 B2 | 4/2017 | Feitisch et al. |
| 10,663,344 B2 | 5/2020 | Hruska |
| 2002/0135763 A1 | 9/2002 | MacKinnon et al. |
| 2003/0095256 A1 | 5/2003 | Cargill et al. |
| 2005/0041248 A1 | 2/2005 | Imura |
| 2005/0248758 A1 | 11/2005 | Carron et al. |
| 2006/0028647 A1 | 2/2006 | Mark |
| 2007/0161876 A1 | 7/2007 | Bambot et al. |
| 2008/0212092 A1 | 9/2008 | Imura et al. |
| 2010/0238794 A1 | 9/2010 | Kanthamneni et al. |
| 2013/0250294 A1 | 9/2013 | Chalmers |
| 2013/0294176 A1 | 11/2013 | Nishio |
| 2013/0321802 A1 | 12/2013 | Imura |
| 2014/0176946 A1 | 6/2014 | Matsumoto et al. |
| 2016/0130940 A1* | 5/2016 | Hsu ................. E21B 49/10 702/11 |
| 2016/0377481 A1 | 12/2016 | Lee |
| 2017/0227521 A1 | 8/2017 | Cafferty et al. |
| 2018/0209909 A1 | 7/2018 | Jian |
| 2018/0238794 A1 | 8/2018 | Kangas et al. |
| 2020/0284655 A1 | 9/2020 | Hruska |

FOREIGN PATENT DOCUMENTS

| | | | |
|---|---|---|---|
| GB | 2424696 A | | 10/2006 |
| JP | H0688749 A | * | 3/1994 |
| SU | 1055973 A1 | * | 11/1983 |

OTHER PUBLICATIONS

International Search Report and Written Opinion for International Application No. 18167839.2, dated Jul. 3, 2018, 12 pages.

* cited by examiner

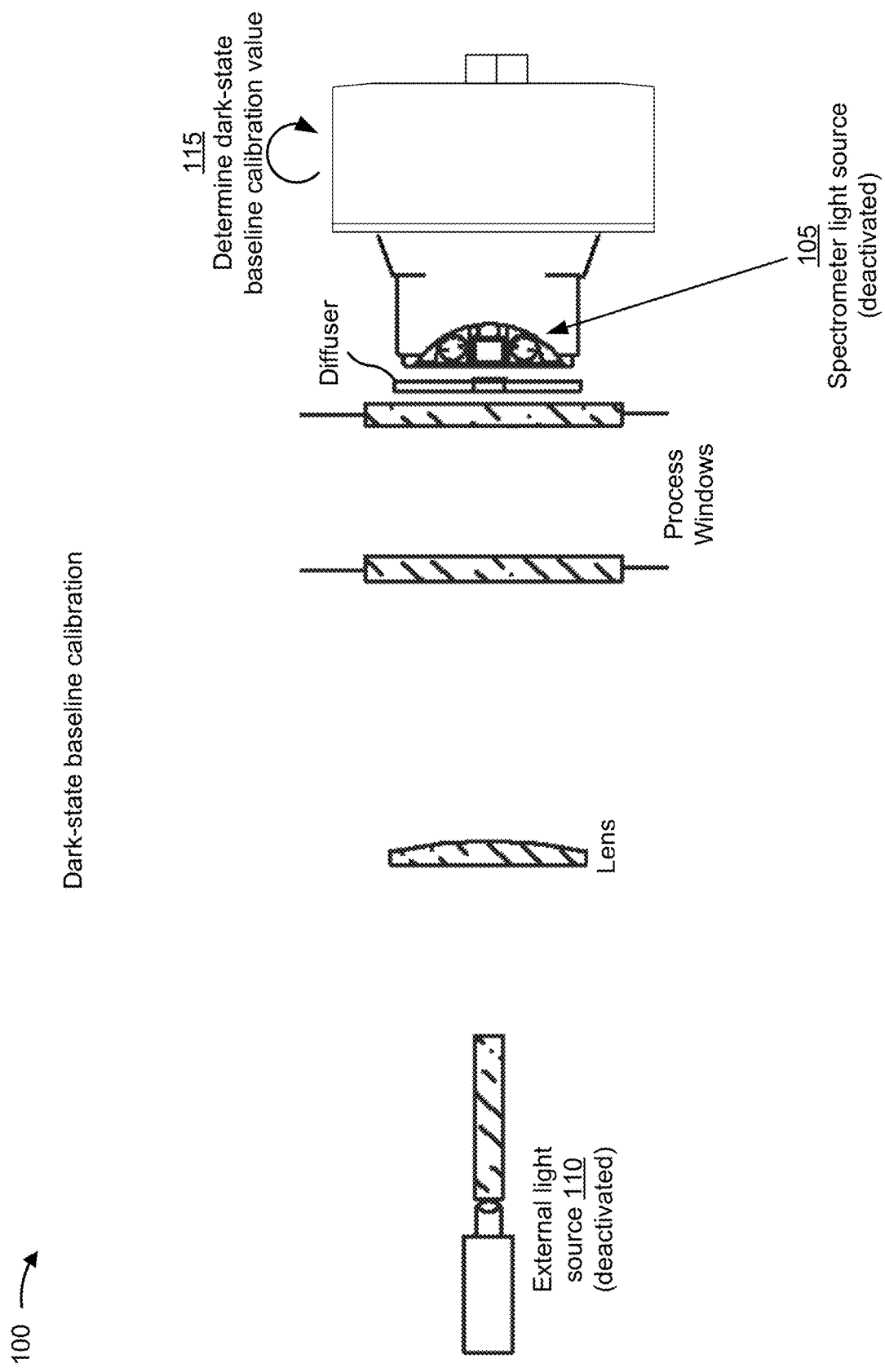

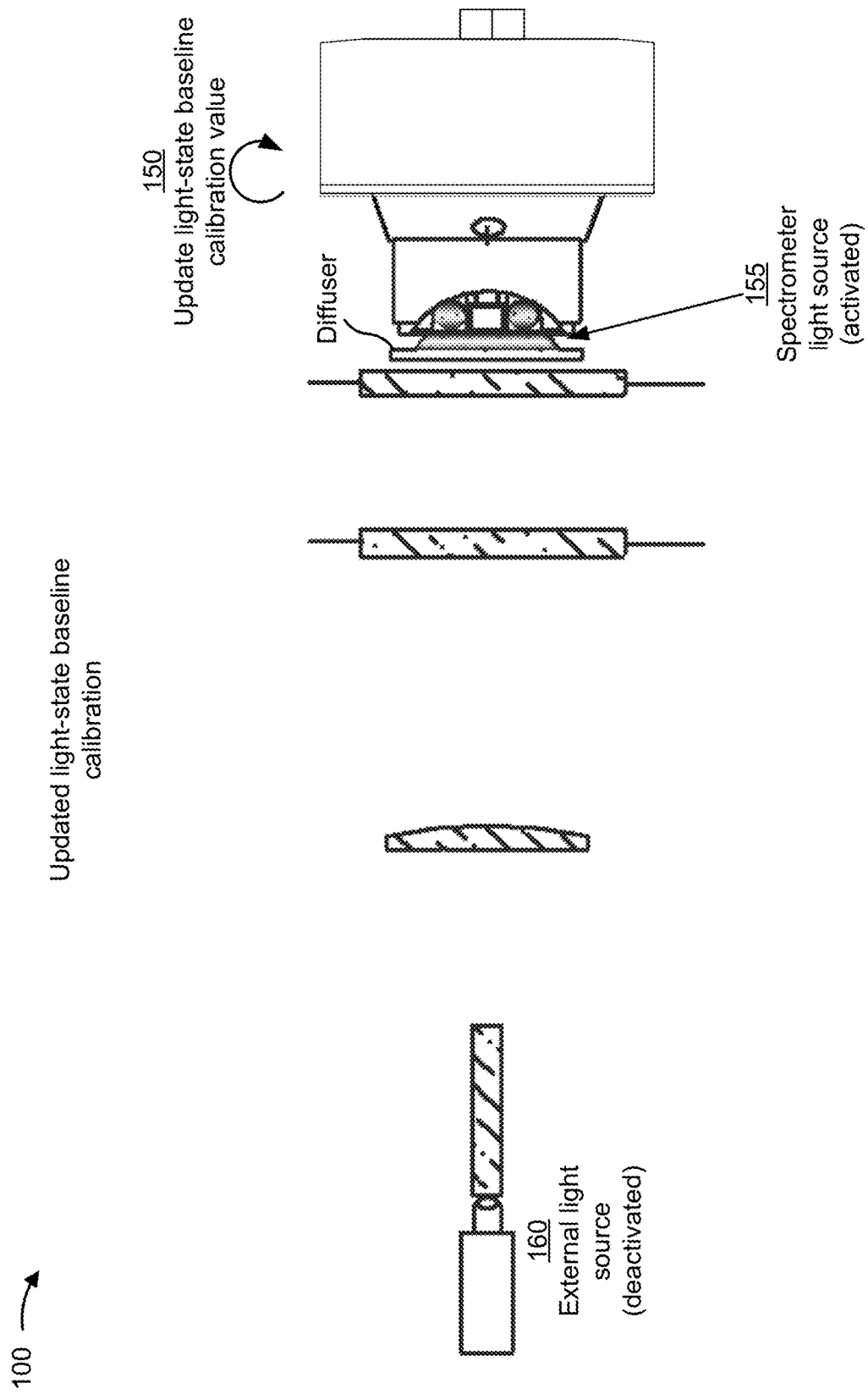

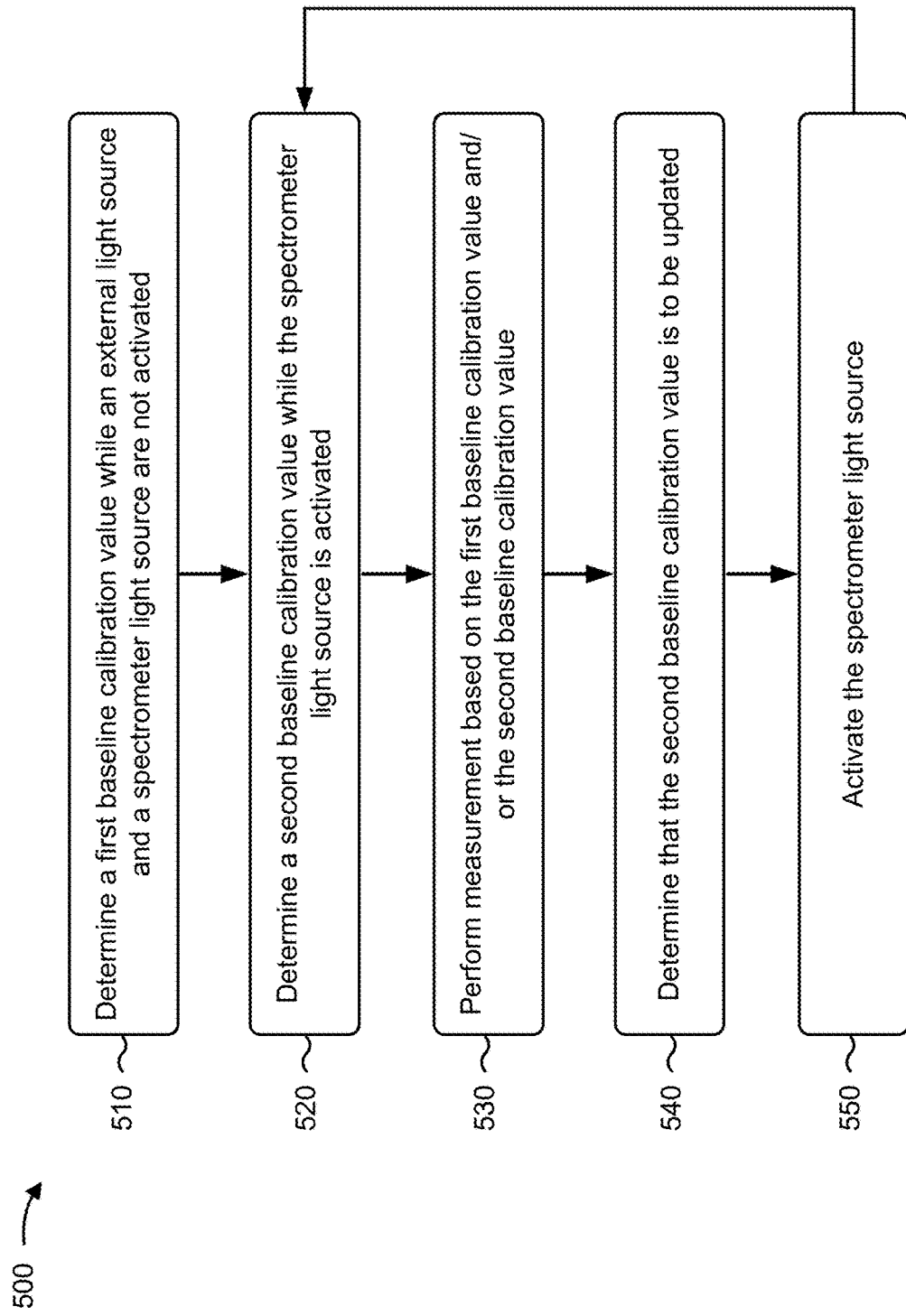

CALIBRATION FOR AN INSTRUMENT (DEVICE, SENSOR)

RELATED APPLICATIONS

This application is a continuation of U.S. patent application Ser. No. 16/879,856, filed May 21, 2020 (now U.S. Pat. No. 11,137,288), which is a continuation of U.S. patent application Ser. No. 15/937,177, filed Mar. 27, 2018 (now U.S. Pat. No. 10,663,344), which claims priority under 35 U.S.C. § 119 to U.S. Provisional Patent Application No. 62/490,445, filed on Apr. 26, 2017, the contents of which are incorporated by reference herein in their entirety.

BACKGROUND

A spectrometer may perform transmission spectroscopy. In transmission spectroscopy, light is passed through a sample and compared to light that has not been passed through the sample. This comparison may provide information based on the path length or sample thickness, the absorption coefficient of the sample, the reflectivity of the sample, the angle of incidence, the polarization of the incident radiation, and, for particulate matter, the particle size and orientation.

SUMMARY

According to some possible implementations, a method performed by a device may include determining a calibration value for a spectrometer using light from a first light source; deactivating the first light source after determining the calibration value; performing measurement of a sample based on the calibration value and after deactivating the first light source, wherein the measurement of the sample is performed using light from a second light source; determining that the calibration value is to be updated; activating the first light source based on determining that the calibration value is to be updated; and updating the calibration value using the light from the first light source after activating the first light source.

According to some possible implementations, a device may include a memory; and one or more processors coupled to the memory, the memory and the one or more processors configured to: determine a calibration value for a spectrometer using light reflected from a first light source of the spectrometer to a sensor of the spectrometer, and wherein the light is reflected from a diffuser of the spectrometer to the sensor; deactivate the first light source after determining the calibration value; perform a measurement of a sample based on the calibration value and after deactivating the first light source, wherein the measurement of the sample is performed using light from a second light source that is received via the diffuser; determine that the calibration value is to be updated; activate the first light source based on determining that the calibration value is to be updated; and update the calibration value using the light from the first light source after activating the first light source.

According to some possible implementations, a non-transitory computer-readable medium may store one or more instructions that, when executed by one or more processors of a spectrometer, cause the one or more processors to: determine a calibration value for the spectrometer using light from a first light source; deactivate the first light source after determining the calibration value; perform measurement with regard to a sample based on the calibration value and after deactivating the first light source, wherein the measurement of the sample is performed using light from a second light source; determine that the calibration value is to be updated; and update the calibration value using the light from the first light source.

BRIEF DESCRIPTION OF THE DRAWINGS

FIGS. 1A-1D are diagrams of an overview of an example implementation described herein;

FIG. 5 is a flow chart of an example process for determining a baseline calibration value and calibrating a transmission spectrometer based on the baseline calibration value.

DETAILED DESCRIPTION

The following detailed description of example implementations refers to the accompanying drawings. The same reference numbers in different drawings may identify the same or similar elements. The following description uses a spectrometer as an example, however, the calibration principles, procedures, and methods described herein may be used with any sensor, including but not limited to other optical sensors and spectral sensors.

Some spectral measurement applications may perform repetitive baseline or calibrating measurements to compensate for thermal and physical effects on the spectrometer sensor or hardware. Reducing the duration between these baseline or calibrating measurements reduces noise and increases repeatability. However, many processes will not tolerate repeating the baseline or calibrating measurements more often than at the start of the measurement period, which may last hours or days. The calibration process can be challenging for transmission measurements while actively measuring a process. For example, a process may be stopped and re-baselined using process material evacuated from the sample location. From a practicality standpoint, this can be challenging and frustrating to the end user.

Some implementations described herein may use a reference point, placed into the measurement area, to perform baselining without needing to stop or impact the process. In some implementations, the reference point may include a diffuser of the spectrometer, and the baseline calibration value may be determined using an internal light source of the spectrometer (sometimes referred to herein as a spectrometer light source). In this way, a device, such as a spectrometer or another type of device may be calibrated in a transmission mode as often as desired to maintain a level of spectral performance appropriate for the end user's application. This may help mitigate effects of temperature on the sensor and may enable the use of sensors that were not previously chosen because of thermal limitations over time. Furthermore, some implementations described herein may not use mechanical devices to perform such calibration. For example, some implementations described herein may be monolithic and/or may use only the activation or deactivation of light sources. Thus, calibration of the device that is transparent to the measurement process and that does not require interruption of manufacturing processes is achieved.

Figure 1B:
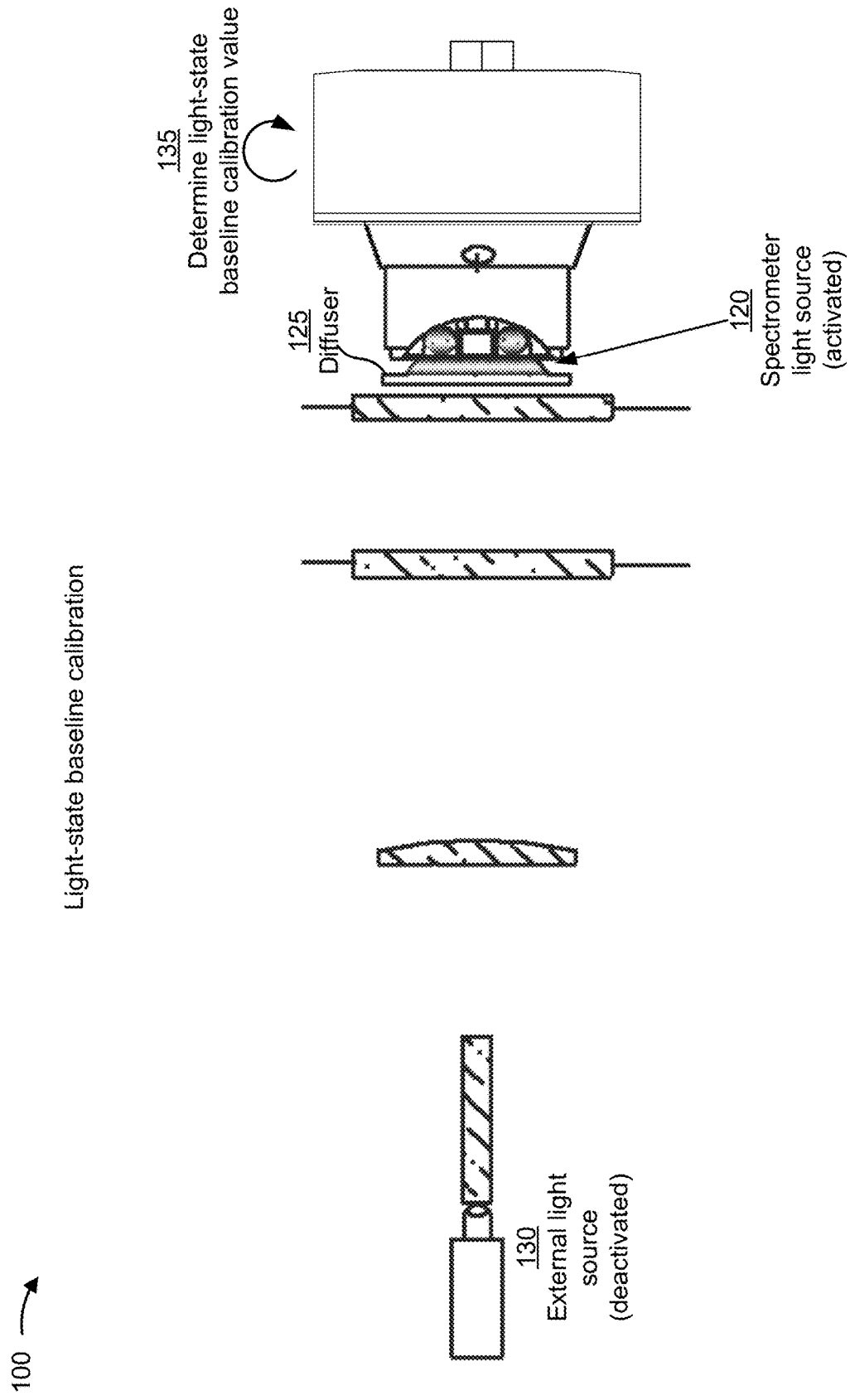
Figure 1C:
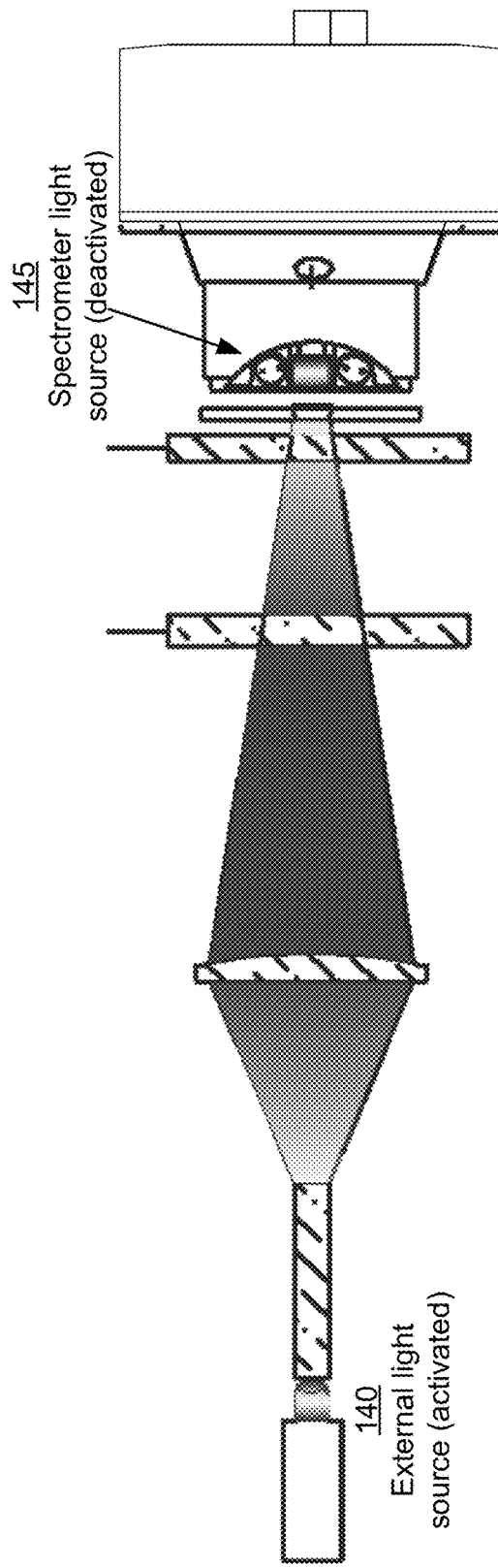

FIGS. 1A-1D are diagrams of an overview of an example implementation 100 described herein. FIG. 1A shows an example of determination of a dark-state baseline calibration value during a dark state of a spectrometer, wherein a spectrometer light source (e.g., a light source internal to the spectrometer or provided between a sensor of the spectrometer and a diffuser of the spectrometer) and an external light source are deactivated. FIG. 1B shows an example of determination of a light-state baseline calibration, wherein the spectrometer light source is activated and the external light source is deactivated. FIG. 1C shows an example of measurement based on the light-state baseline calibration. Finally, FIG. 1D shows a determination of an updated light-state baseline calibration value, which may be used to calibrate measurements of the spectrometer. In FIGS. 1A-1D, a control device is not shown. In some implementations, one or more of the operations described with regard to FIGS. 1A-1D may be performed by a control device. The control device may be separate from the spectrometer, may be included in the spectrometer, or may be associated with the spectrometer in another fashion.

FIG. 1A shows an example of a dark state of the spectrometer. As shown in FIG. 1A, and by reference number 105, in the dark state, a spectrometer light source (e.g., one or more lamps of the spectrometer) may be deactivated. As shown by reference number 110, an external light source associated with the spectrometer may be deactivated in the dark state. As shown by reference number 115, the spectrometer may determine a dark-state baseline calibration value. For example, the spectrometer may determine the dark-state baseline calibration while both light sources are deactivated. In this way, a dark-state baseline calibration value is determined without the use of moving parts, such as mechanical flags and/or the like.

FIG. 1B shows an example of determination of a light-state baseline calibration value for the spectrometer. As shown in FIG. 1B, and by reference number 120, the spectrometer light source may be activated for determination of the light-state baseline calibration value. In such a case, light from the spectrometer light source may reflect off a diffuser 125 to present repeatable light conditions for determination of the light-state baseline calibration value. As shown by reference number 130, the external light source may be deactivated for determination of the light-state baseline calibration value. As shown by reference number 135, the spectrometer may determine the light-state baseline calibration value based on the spectrometer light source (e.g., based on the reflection of the spectrometer light source from the diffuser 125). This may provide a repeatable method to perform relative baselines without the use of moving parts, stopping a manufacturing or measurement process, cleaning a measurement system, or accessing difficult-to-reach measurement locations. Additionally, or alternatively, this process may provide increased accuracy of measurements because calibration can occur many times a minute if needed to compensate for a thermally variable environment.

In some implementations, the spectrometer may activate the external light source in addition to the spectrometer light source to determine the light-state baseline calibration value. This may provide for baselining based on relative spectral measurements using the external light source and the spectrometer light source. In some implementations, the spectrometer may activate the spectrometer light source and not the external light source to determine the light-state baseline calibration value. This may conserve energy and simplify determination of the light-state baseline calibration value.

FIG. 1C shows an example of performing measurement based on a baseline calibration value. As shown in FIG. 1C, and by reference number 140, the spectrometer may deactivate the spectrometer light source. As shown by reference number 145, the spectrometer may activate the external light source. As shown, the external light source may provide light through a lens (e.g., an aspheric lens) to sample windows (e.g., a cuvette, etc.). The sample to be measured may be provided between the sample windows. The light may interact with the sample and may continue to the diffuser. The diffuser may diffuse the light for measurement by a sensor of the spectrometer (not shown). The spectrometer may perform the measurement based on a baseline calibration value, such as the dark-state baseline calibration value and/or the light-state baseline calibration value. For example, the spectrometer may determine an adjustment for the measurement based on the baseline calibration value.

FIG. 1D shows an example of updating a baseline calibration value using the light-state baseline calibration technique. As shown by reference number 150, the spectrometer may determine to update the light-state baseline calibration value. In some implementations, the spectrometer may perform the update periodically (e.g., at a predefined interval). In some implementations, the spectrometer may perform the update based on a threshold, such as a threshold temperature change, a threshold number of measurements, and/or the like.

As shown by reference number 155, the spectrometer may activate the spectrometer light source to determine the updated light-state baseline calibration value. For example, the spectrometer may activate the spectrometer light source to reflect light that originates from the spectrometer light source off of the diffuser and back to the sensor. The spectrometer may determine the updated light-state baseline calibration value based on the reflected light. In this way, the spectrometer updates the baseline calibration value without using moving parts, such as mechanical flags and/or the like, to perform the calibration.

As shown by reference number 160, the spectrometer may deactivate the external light source to update the light-state baseline calibration value. In some implementations, the spectrometer may determine the light-state baseline calibration value while the external light source is activated, as described in more detail in connection with FIG. 1B, above.

In this way, a transmission spectrometer may be calibrated using a spectrometer light source to maintain a level of spectral performance appropriate for an end user's application. This may help mitigate effects of temperature on the sensor and may enable the use of sensors that were not previously chosen because of thermal limitations over time. Furthermore, some implementations described herein may not use mechanical devices with moving parts, such as a calibration flag, to perform such calibration. For example, some implementations described herein may be monolithic and/or may use only the activation or deactivation of light sources and measurement components of the spectrometer. Thus, calibration of the spectrometer that is transparent to the measurement process and that does not require interruption of manufacturing processes is achieved.

As indicated above, FIGS. 1A-1D are provided merely as examples. Other examples are possible and may differ from what was described with regard to FIGS. 1A-1D. For example, the operations described in FIGS. 1A-1D may be performed for a device other than a spectrometer.

Figure 2:
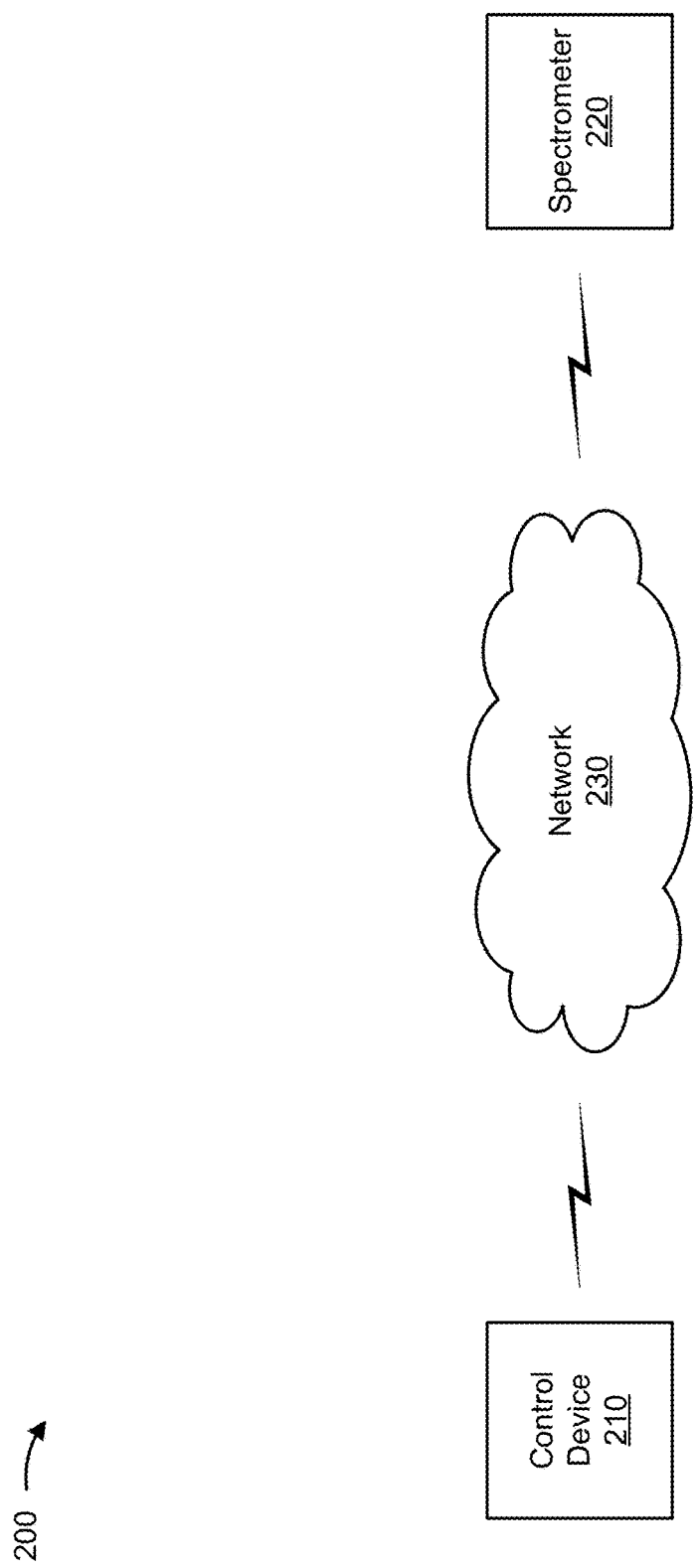
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a control device 210, a spectrometer 220, and a network 230. Devices of environment 200 may interconnect via wired connections, wireless connections, or a combination of wired and wireless connections.

Control device 210 includes one or more devices capable of storing, processing, and/or routing information associated with spectroscopic calibration. For example, control device 210 may include a server, a computer, a wearable device, a cloud computing device, and/or the like. In some implementations, control device 210 may store, process, and/or determine information associated with a baseline of spectrometer 220. In some implementations, control device 210 may calibrate spectrometer 220 and/or determine a measurement based on the baseline of spectrometer 220. In some implementations, control device 210 may be associated with a particular spectrometer 220. In some implementations, control device 210 may be associated with multiple spectrometers 220. In some implementations, control device 210 may be a component of spectrometer 220. In some implementations, control device 210 may receive information from and/or transmit information to another device in environment 200, such as spectrometer 220.

Spectrometer 220 includes one or more devices capable of performing a spectroscopic measurement on a sample. For example, spectrometer 220 may include a spectrometer device that performs spectroscopy (e.g., vibrational spectroscopy, such as a near infrared (NIR) spectrometer, a mid-infrared spectroscopy (mid-IR), Raman spectroscopy, and/or the like). In some implementations, spectrometer 220 may include a transmission spectrometer, as described in more detail in connection with FIG. 4, below. In some implementations, spectrometer 220 may be incorporated into a wearable device, such as a wearable spectrometer and/or the like. In some implementations, spectrometer 220 may receive information from and/or transmit information to another device in environment 200, such as control device 210.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
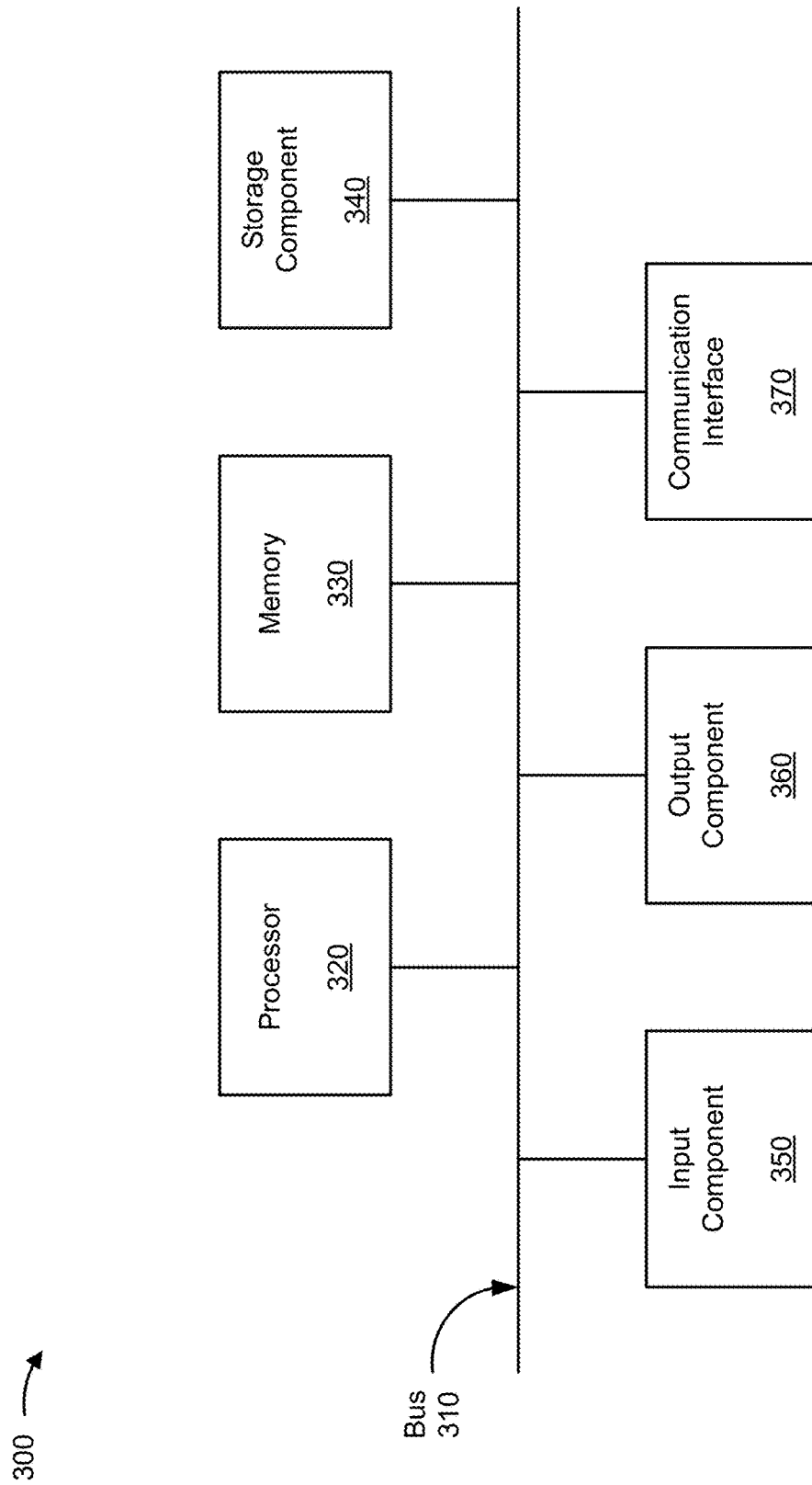
FIG. 3 is a diagram of example components of one or more devices of FIG. 2.

FIG. 3 is a diagram of example components of a device 300. Device 300 may correspond to a control device 210 and/or a spectrometer 220. In some implementations control device 210 and/or a spectrometer 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
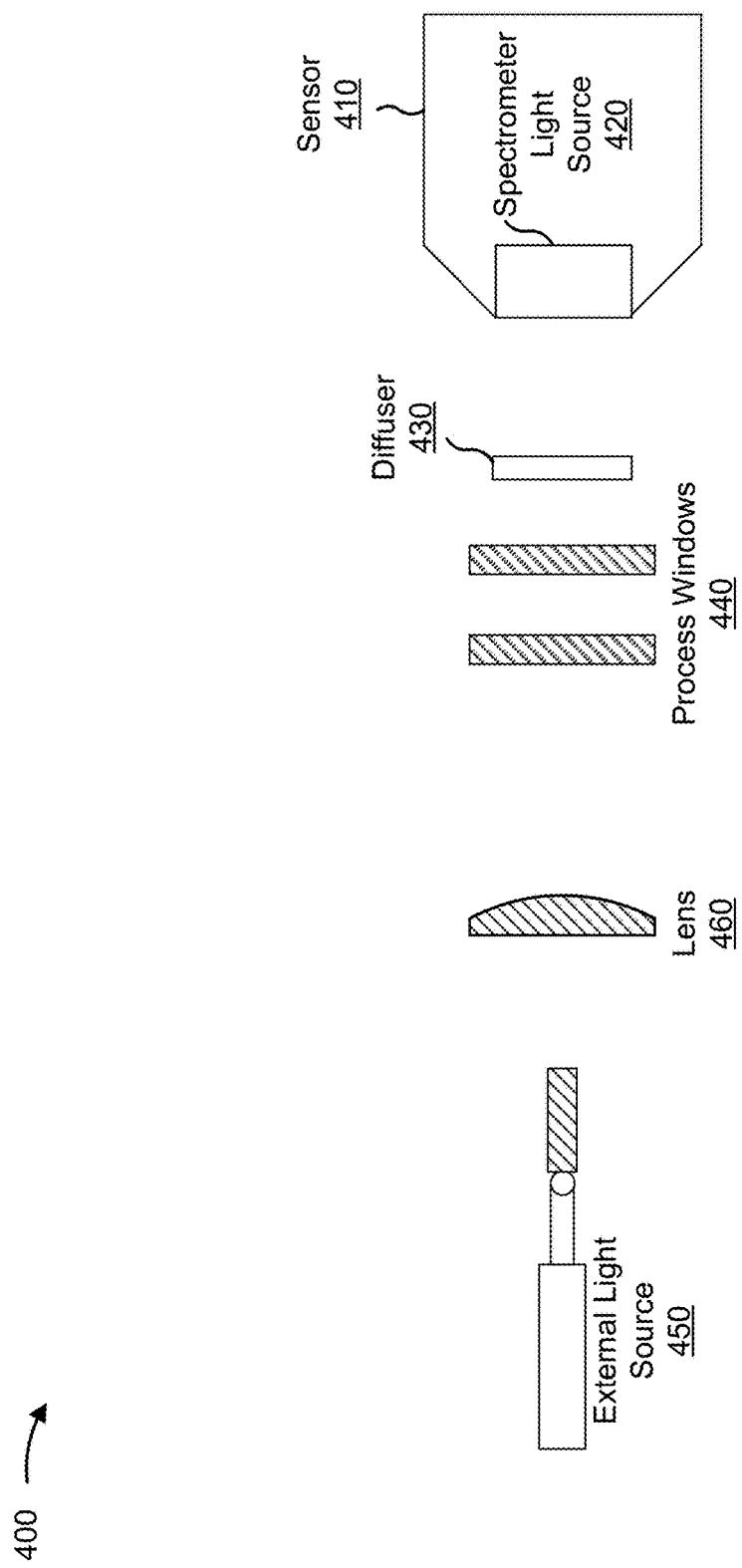
FIG. 4 is a diagram of an overview of a transmission spectrometer described herein.

FIG. 4 is a diagram of an overview of components of a transmission spectrometer system 400 described herein. As shown, transmission spectrometer system 400 may include a sensor 410, a spectrometer light source 420, a diffuser 430, process windows 440, an external light source 450, and/or a lens 460. In some implementations, transmission spectrometer system 400 may include control device 210 and/or spectrometer 220.

Sensor 410 includes a sensor to perform spectroscopy with regard to a sample based on light transmitted via the sample (e.g., light transmitted by external light source 450). In some implementations, sensor 410 may receive light generated by spectrometer light source 420, such as light reflected by diffuser 430. In some implementations, sensor 410 may perform measurement based on a calibration value (e.g., a light-state and/or dark-state baseline calibration value).

Spectrometer light source 420 includes one or more lamps of transmission spectrometer system 400. Spectrometer light source 420 may generate light to be used for determination of a light-state baseline calibration value. The light generated by spectrometer light source 420 may reflect off diffuser 430 and back to sensor 410. By using spectrometer light source 420 to perform light-state calibration, a flow associated with a sample (e.g., a sample flowing between process windows 440) need not be interrupted. This may increase the frequency of baselining, thereby improving measurement accuracy and enabling the use of transmission spectrometer system 400 in more variable temperature conditions.

Diffuser 430 includes a component that diffuses light reflected or transmitted via diffuser 430. In some implementations, diffuser 430 may prevent or reduce spatial or spectral content (e.g., parasitic or noncoherent spectral features) of light provided to sensor 410. In some implementations, diffuser 430 may include polytetrafluoroethylene (PTFE), which may reduce a cost of diffuser 430 in comparison to other materials. In some implementations, diffuser 430 may include another material, such as polystyrene, which may increase a spectral range of diffuser 430. In some implementations, diffuser 430 may include a holographic diffuser, a frosted surface, and/or the like. In some implementations, diffuser 430 may be located between approximately 2 mm and approximately 5 mm from a nearest process window of process windows 440.

Process windows 440 may partially or completely enclose a sample for which transmission spectroscopy is to be performed using external light source 450. For example, process windows 440 may include a cuvette or a similar enclosure (e.g., an optically clear container for holding liquid samples). In some implementations, process windows 440 may enclose a flowing sample. For example, the sample to be measured by transmission spectrometer system 400 may be in a flowing state. In such a case, the ability to perform baseline calibration using spectrometer light source 420 may be particularly valuable, since it may be expensive and undesirable to interrupt the flowing state of the sample.

External light source 450 includes one or more lamps for performing transmission spectrometry of the sample. In some implementations, external light source 450 may be included in transmission spectrometer system 400. In some implementations, external light source 450 may be separate from transmission spectrometer system 400. In some implementations, external light source 450 may be controlled by a control device (e.g., control device 210) and/or a spectrometer (e.g., spectrometer 220, transmission spectrometer system 400, etc.). Light generated by external light source 450 may transmit via a lens 460 (e.g., an aspheric lens) through the sample within process windows 440. Lens 460 may focus and/or collimate the light from external light source 450. The light generated by external light source 450 may be diffused by diffuser 430, and may be sensed by sensor 410. Transmission spectrometer system 400 (e.g., and/or a control device associated with transmission spectrometer system 400) may determine a measurement based on the light generated by external light source 450 and based on a light-state baseline calibration value determined using the spectrometer light source 420. In some implementations, external light source 450 may include a solid light pipe, shown as a hatched cylinder.

The number and arrangement of components shown in FIG. 4 are provided as an example. In practice, transmission spectrometer system 400 may include additional components, fewer components, different components, or differently arranged components than those shown in FIG. 4. Additionally, or alternatively, a set of components (e.g., one or more components) of transmissions spectrometer 400 may perform one or more functions described as being performed by another set of components of transmission spectrometer system 400.

FIG. 5 is a flow chart of an example process 500 for determining a baseline calibration value and calibrating a transmission spectrometer based on the baseline calibration value. In some implementations, one or more process blocks of FIG. 5 may be performed by control device 210. In some implementations, one or more process blocks of FIG. 5 may be performed by another device or a group of devices separate from or including control device 210, such as spectrometer 220 or a different device.

As shown in FIG. 5, process 500 may include determining a first baseline calibration value while an external light source and a spectrometer light source are not activated (block 510). For example, control device 210 (e.g., using processor 320, communication interface 370, and/or the like) may determine a first baseline calibration value while an external light source (e.g., external light source 450) and a spectrometer light source (e.g., spectrometer light source 420) are not activated. In some implementations, the first baseline calibration value may be a dark-state baseline calibration value. Control device 210 may use the first baseline calibration value and a second baseline calibration value (described below) to perform measurement of a sample, as described in more detail below.

As further shown in FIG. 5, process 500 may include determining a second baseline calibration value while the spectrometer light source is activated (block 520). For example, control device 210 (e.g., using processor 320, communication interface 370, and/or the like) may determine a second baseline calibration value while the spectrometer light source is activated. The second baseline calibration value may be the light-state baseline calibration value, described elsewhere herein. In some implementations, control device 210 may determine the second baseline calibration value while the external light source is deactivated, as described in more detail elsewhere herein. Additionally, or alternatively, control device 210 may determine the second baseline calibration value while the external light source is activated, as is also described in more detail elsewhere herein. Control device 210 may determine the second baseline calibration value using light that is reflected from a reference point of spectrometer 220, such as a diffuser 430 of transmission spectrometer system 400 or spectrometer 220, which reduces or eliminates the need for mechanical components for baselining, such as baselining flags and/or the like. Thus, baselining may be performed without operation of a mechanical component of the spectrometer, such as a mechanical flag or a similar reference point for calibration.

As further shown in FIG. 5, process 500 may include performing measurement based on the first baseline calibration value and/or the second baseline calibration value (block 530). For example, control device 210 (e.g., using processor 320, communication interface 370, and/or the like) may perform measurement using a sensor (e.g., sensor 410) of the spectrometer by activating the external light source (e.g., and allowing the external light source to stabilize). Control device 210 may perform the measurement based on the first baseline calibration value and/or the second baseline calibration value. For example, when control device 210 has determined a dark-state baseline calibration value and a light-state baseline calibration value, control device 210 may use the dark-state baseline calibration value and the light-state baseline calibration value to perform the measurement. When control device 210 has determined a light-state baseline calibration value and not a dark-state baseline calibration value, control device 210 may perform the measurement using the light-state baseline calibration value. In some implementations, control device 210 may deactivate the spectrometer light source to perform the measurement, which may reduce interference with the measurement due to light from the spectrometer light source.

As further shown in FIG. 5, process 500 may include determining that the second baseline calibration value is to be updated (block 540). For example, control device 210 (e.g., using processor 320, communication interface 370, and/or the like) may determine that the second baseline calibration value (e.g., the light-state baseline calibration value) is to be updated. In some implementations, control device 210 may determine that the second baseline calibration value is to be updated based on a threshold, such as a threshold temperature change, a threshold length of time since a last update to the second baseline calibration value, a threshold deviation of a measurement from an expected or previous value, and/or the like. In some implementations, control device 210 may determine that the second baseline calibration value is to be updated based on an input, such as a user input to trigger the updating of the second baseline calibration value.

As further shown in FIG. 5, process 500 may include activating the spectrometer light source, and updating the second baseline calibration value while the spectrometer light source is activated (block 550, and returning to block 520). For example, control device 210 (e.g., using processor 320, communication interface 370, and/or the like) may have deactivated the spectrometer light source to perform the measurement of the sample. Control device 210 may reactivate the spectrometer light source to update the second baseline calibration value. For example, control device 210 may reactivate the spectrometer light source so that light from the spectrometer light source reflects from the diffuser to the sensor, thereby enabling baselining of spectrometer 220 without using mechanical means such as baselining flags, which reduces expense of measurement and enables the implementation of the spectrometer in hard-to-reach places, which may have been hampered by concerns about accessibility of the spectrometer for resolving issues with the mechanical means. Further, updating baselining using the spectrometer light source may require less interruption (or no interruption) of a flow state of the sample to be measured, which may reduce expense and increase the viable frequency of baselining. This, in turn, may enable the use of the spectrometer in more variable temperature conditions than a spectrometer that is not capable of performing baselining as frequently.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, a transmission spectrometer (e.g., spectrometer 220 or transmission spectrometer system 400) may be calibrated using a spectrometer light source (e.g., spectrometer light source 420) to maintain a level of spectral performance appropriate for an end user's application. This may help mitigate effects of temperature on the sensor (e.g., sensor 410) and may enable the use of sensors that were not previously chosen because of thermal limitations over time. Furthermore, some implementations described herein may not use mechanical components to perform such calibration. For example, some implementations described herein may be monolithic and/or may use only the activation or deactivation of light sources (e.g., spectrometer light source 420 and/or external light source 450). Thus, calibration of the spectrometer that is transparent to the measurement process and that does not require interruption of manufacturing processes is achieved.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

As used herein, the term "or" is meant to mean (or be the equivalent of) "and/or," unless otherwise stated. In other words, as used herein, the term "or" is an inclusive "or," unless explicitly stated otherwise (e.g., when "or" is used in combination with "either one of").

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system comprising:
    a spectrometer light source to generate light used for determination of a baseline calibration value;
    a sensor to:
        receive the light used for determination of the baseline calibration value, receive light transmitted via a sample, and
        perform spectroscopy with regard to the sample based on the light transmitted via the sample and the baseline calibration value;
    a process window; and
    a diffuser located between the spectrometer light source and the process window.

2. The system of claim 1, wherein the diffuser is configured to reflect, to the sensor, the light used for determination of the baseline calibration value.

3. The system of claim 1, wherein the sensor includes the spectrometer light source.

4. The system of claim 1, further comprising:
    an external light source to transmit the light transmitted via the sample.

5. The system of claim 1, wherein the light used for determination of the baseline calibration value is received without interrupting a flow associated with the sample.

6. The system of claim 1, further comprising:
    a different process window,
        wherein the sample is a sample flowing between the process window and the different process window.

7. The system of claim 1, a wherein the diffuser is configured to diffuse the light used for determination of the baseline calibration value.

8. The system of claim 1, wherein the diffuser is located between approximately 2 millimeters (mm) and approximately 5 mm from the process window.

9. The system of claim 7, further comprising:
    a different process window,
        wherein the process window and the different process window include an enclosure for holding the sample.

10. The system of claim 1, further comprising:
    an external light source to generate the light transmitted via the sample; and
    a lens to one or more of focus or collimate the light transmitted via the sample before the light transmitted via the sample is transmitted via the sample.

11. The system of claim 1, wherein the baseline calibration value is a light-state baseline calibration value.

12. The system of claim 1, wherein, when performing the spectroscopy, the sensor is to:
    determine a measurement based on the light transmitted via the sample and the baseline calibration value.

13. A method, comprising:
    reflecting, by a diffuser of a spectrometer system, light used for determination of a baseline calibration value, wherein the diffuser is located between a spectrometer light source of the spectrometer system and a process window of the spectrometer system;
    receiving, by a sensor of the spectrometer system, the light used for determination of the baseline calibration value;
    determining, by the spectrometer system, the baseline calibration value based on the light used for determination of the baseline calibration value;
    receiving, by the sensor of the spectrometer system, light transmitted via a sample; and
    performing, by the spectrometer system, spectroscopy with regard to the sample based on the light transmitted via the sample and the baseline calibration value.

14. The method of claim 13, wherein the light transmitted via the sample is generated by an external light source that is different from the spectrometer light source.

15. The method of claim 14, wherein the external light source is separate from the spectrometer system.

16. The method of claim 13, wherein the light transmitted via the sample is transmitted via the sample while the sample is being held in an enclosure of process windows.

17. The method of claim 13, wherein the light used for determination of the baseline calibration value is reflected to the sensor before the sensor receives the light used for determination of the baseline calibration value.

18. A system, comprising:
    process windows that partially or completely enclose a sample;
    a first light source to generate first light;
    a diffuser located between the process windows and the first light source; and
    a second light source to generate second light; and
    one or more components to:
        determine a baseline calibration value based on the first light;
        and
        perform spectroscopy with regard to the sample based on the second light and the baseline calibration value.

19. The system of claim 18,
    wherein the one or more components include a sensor,
    wherein the first light source is a spectrometer light source, and
    wherein the sensor includes the spectrometer light source.

20. The system of claim 18,
    wherein the second light source is an external light source,
    wherein the system further comprises a lens, and
    wherein the second light is transmitted via the lens before the second light is transmitted via the sample.

* * * * *